United States Patent Office — 3,748,180
Patented July 24, 1973

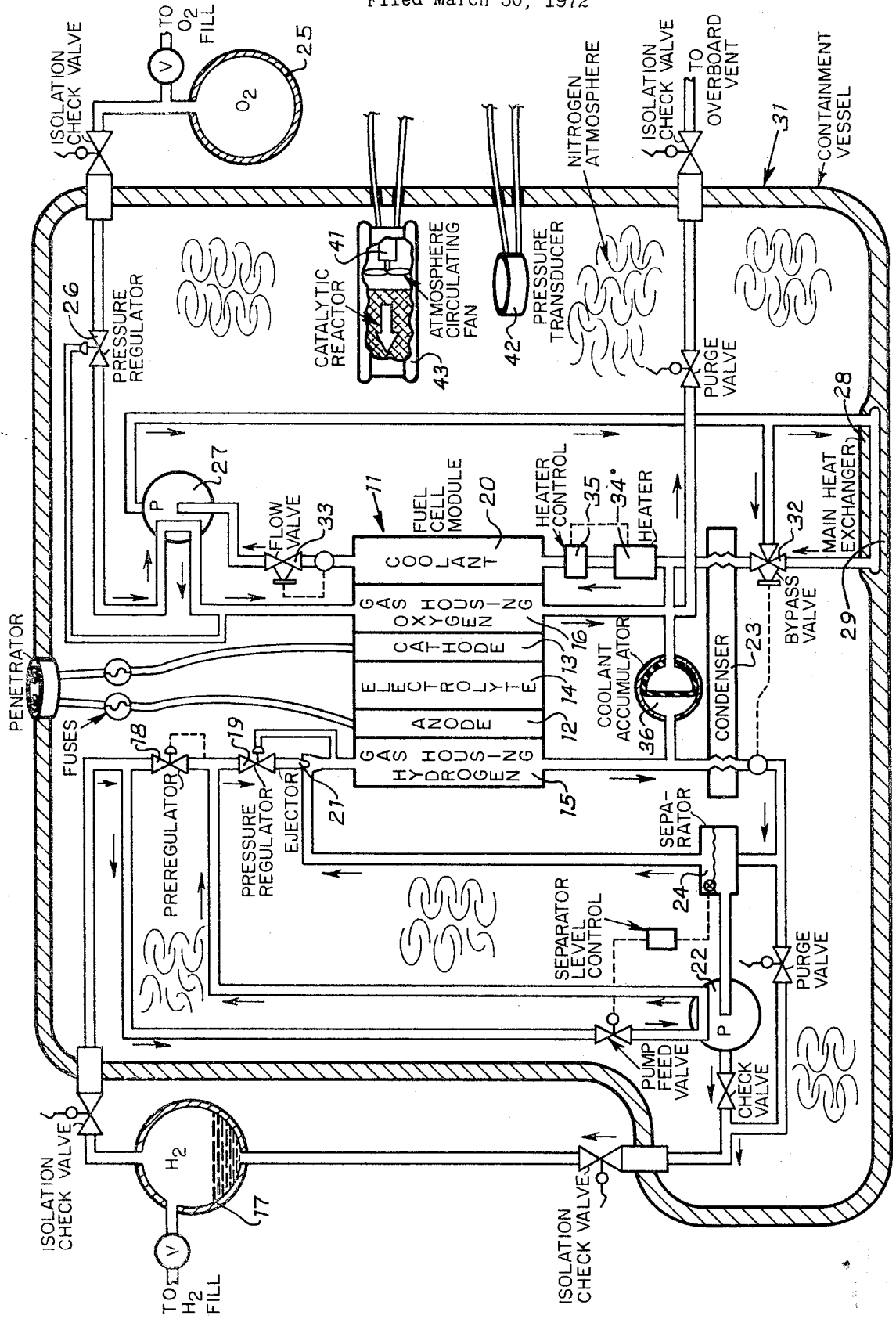

3,748,180
FUEL CELL SYSTEM FOR UNDERWATER VEHICLE
Joseph V. Clausi, Portland, Michael B. Landau, Hartford, and George Vartanian, Rockville, Conn., assignors to the United States of America as represented by the Secretary of the Navy
Filed Mar. 30, 1972, Ser. No. 239,609
Int. Cl. H01m 27/00, 27/12
U.S. Cl. 136—86 B    5 Claims

ABSTRACT OF THE DISCLOSURE

A fuel cell system for an underwater vehicle having at least one fuel cell module for supplying electrical power for said vehicle. A first tank containing hydrogen is connected to one reactant chamber of a fuel cell module and a second tank containing oxygen is connected to another reactant chamber of the fuel cell module. The hydrogen-product water output from the hydrogen reactant chamber is condensed and separated and the water produced is stored in the first tank containing hydrogen. The fuel cell module is placed in a containment vessel which is pressurized with nitrogen. A catalytic reactor is provided in the containment vessel to form water in the event that there are simultaneous leaks in both the hydrogen and oxygen high pressure supply lines. A pressure transducer is also provided in the containment vessel for shutting down the system if there is a high pressure leak in either the hydrogen or oxygen line.

BACKGROUND OF THE INVENTION

The present invention relates to a fuel cell system suitable for use in an underwater vehicle.

Fuel cells and fuel cell systems have been used in the past for generating electricity. An electromotive force is produced by bringing an oxidant and a fuel in contact with two suitable electrodes and an electrolyte. A fuel is introduced at one electrode where it reacts electrochemically with the electrolyte to impart electrons to the fuel electrode. Simultaneously an oxidant is introduced to the second electrode where it reacts electrochemically with the electrolyte to consume electrons at the oxidant electrode. Connecting the two electrodes through an external circuit causes an electrical current to flow in the circuit and withdraws electrical power from the cell. The overall fuel cell reaction produces electrical energy which is the sum of the separate half cell reactions. A by-product of the reaction is formed as well as some heat.

There are two prime requirements for fuel cells which are to be used in space vehicles or underwater vehicle. The first consideration is that of safety, for either an explosion or a malfunction could result in loss of life of personnel using the vehicle. The second consideration is size and weight as these items are often of a critical nature.

SUMMARY OF THE INVENTION

The present invention relates to a fuel cell system for providing electrical energy for an underwater vehicle. A fuel cell module is placed within a containment vessel and hydrogen and oxygen are supplied from tanks placed outside the containment vessel. The hydrogen and oxygen are passed through a fuel cell module to generate electricity for an underwater vehicle. The oxygen flowing from the fuel cell module is vented overboard and the hydrogen-product water flowing from the hydrogen reaction chamber is condensed and the water is separated from the hydrogen and stored in the hydrogen tank.

An atmosphere control system is provided to prevent an accumulation of hydrogen or oxygen within the containment vessel in the event of a leak in either the hydrogen or oxygen supply systems. Nitrogen is maintained in the containment vessel at a pressure greater than the operating pressure of the fuel cell module and nitrogen flows into the fuel cells through a leak rather than reactants flowing into the containment vessel. Leakage from a high pressure hydrogen or oxygen line is sensed by a pressuure transducer inside the containment vessel which shuts off the reactants. In the event of simultaneous leaks in both the hydrogen and oxygen pressure supply lines, the gases are reacted by a catalytic reactor to form water. A fan is also provided within the containment vessel to circulate the nitrogen atmosphere and render any leakage of hydrogen and oxygen inert.

BRIEF DESCRIPTION OF THE DRAWING

The figure of the drawing is a schematic representation of a preferred embodiment of the present invention.

DESCRIPTION OF THE PREFERRED EMBODIMENT

Referring to the drawing, there is shown a fuel cell module 11 having an anode 12 and cathode 13 separated by an electrolyte 14. By way of example, the fuel cell module might be comprised of a sintered catalyzed anode 12, a catalyzed screen cathode 13 and a porous asbestos matrix which contains electrolyte 14. The sintered anode 12 might be a platinum-palladium-activated, porous nickel sinter with a supporting nickel screen. The catalyst provides a reaction site for the oxidation of hydrogen. The open pores in the electrode structure provide a path for the transport of hydrogen gas to these reaction sites. The pores filled with electrolyte permit the transport of hydroxyl ions to the liquid-gas interface. The nickel structure and support screen will provide a low resistance path for electron flow to the cell housing. The screen cathode 13 might consist of a silver-plated, fine-mesh nickel screen embedded in a porous Teflon structure activated with a platinum catalyst. The catalyst agglomerates provide a reaction site for the reduction of oxygen at the gas/electrolyte interface. The Teflon provides non-wetting pores for the transport of oxygen gas to the reaction sites. The screen serves as a structural support, a current collector, and provides a low resistance path for electron flow from the cell housing to the reaction sites. The electrolyte 14 might be aqueous potassium hydroxide.

A hydrogen reaction chamber 15 is provided adjacent anode 12, and an oxygen reaction chamber 16 is provided adjacent cathode 13. A cooling system, represented by chamber 20, is provided to remove excess heat from fuel cell module 11.

A tank 17 contains a supply of hydrogen which is supplied to hydrogen reaction chamber 15 through a pre-regulator 18, a regulator 19 and an ejector 21. By way of example, hydrogen in tank 17 is at a high pressure of between 7500 and 400 p.s.i.a. and is regulated to 200 p.s.i.a. by preregulator 18. The preregulator 18 supplies hydrogen to regulator 19 on demand and provides a fixed back pressure for a hydrogen gas-driven product water pump 22. Pressure regulator 19 supplies hydrogen to fuel cell module 11 on demand through ejector 21 and maintains module hydrogen pressure at 60 p.s.i.a. The incoming hydrogen is the primary flow of ejector 21 and is the driving force which circulates a hydrogen stream through the fuel cell module 11, a condenser 23 and product water separator 24 for product water removal.

Product water evaporates into the circulating hydrogen stream which passes through the anode cavity of each cell. The water is carried to condenser 23 and condensed, and the condensate-hydrogen mixture flows to separator 24 which separates condensate by gravity from the hydrogen stream. The dried hydrogen stream circulates back to ejector 21 to begin the process again and the product water is pumped by pump 22 to tank 17 for storage.

A second tank 25 contains high pressure oxygen which is supplied through regulator 26 to fuel cell module 11. A cooling system is provided for the fuel cell module 11 and oxygen flowing from regulator 26 to module 11 is expanded to provide the driving power for a coolant pump 27. By way of example, oxygen in tank 25 is at a pressure of between 4500 p.s.i.a. and 220 p.s.i.a. and regulator 26 reduces the pressure to 60 p.s.i.a., the supply pressure of module 11, and regulator 26 supplies oxygen on demand to module 11. Oxygen regulator 26 and hydrogen regulator 19 are coupled pneumatically to ensure equal pressures in the oxygen and hydrogen cavities of module 11 regardless of variations in supply pressure. In the event the high pressure hydrogen supply to module 11 is interrupted, the oxygen regulator closes, shutting off the oxygen supply to cathode 13.

Warm coolant from module 11 is pumped from the module stack to a heat exchanger 28 where the coolant is cooled and waste heat is rejected through the walls 29 of the containment vessel 31. The reduced temperature coolant then flows to condenser 23 where it absorbs the product water heat of condensation and the module 11, absorbing waste heat, and then is again pumped to the main heat exchanger 28. Condensate temperature is maintained by a bypass valve 32, and the temperature of the coolant at the module exit is maintained by a flow valve 33. Bypass valve 32 varies the amount of coolant passing through heat exchanger 28. If condensate temperature rises, more coolant passes through heat exchanger 28 thereby decreasing the temperature of the coolant entering condenser 23 and reduces the condensate temperature to its design value. When condensate temperature is too low, bypass valve 32 decreases flow of coolant to heat exchanger 28. Flow valve 33 maintains temperature of module 11 by varying coolant flow rate. When the module coolant temperature decreases, flow valve 33 decreases flow rate of coolant through the module and causes temperature in module 11 to rise. During high power operation, valve 33 allows more coolant to pass through module 11. During periods of low power operation, module temperature is maintained by heater 34 and heater control 35. By way of example, containment vessel 31 might extend through the walls of the vehicle and into the sea thereby permitting waste heat to be rejected into the sea. The pressure level of the cooling system is controlled by an accumulator 36 which accommodates coolant thermal expansion and is referenced to hydrogen pressure.

An atmosphere control system is provided to prevent accumulation of hydrogen or oxygen within containment vessel 31. The atmosphere control system components are a fan 41, pressure transducer 42, catalytic reactor 43, and a nitrogen atmosphere within containment vessel 31. Any leaks in the 60 p.s.i.a. components into containment vessel 31 are prevented by maintaining a nitrogen atmosphere with vessel 31 at approximately 70 p.s.i.a. Nitrogen flows into the components through a leak rather than reactants into vessel 31. Leakage from a high pressure hydrogen or oxygen line causes pressure inside vessel 31 to rise and this rise is sensed by pressure transducer 42 which causes the reactants to be shut off automatically. In the event of a simultaneous leak in both the hydrogen and oxygen high pressure supply lines, these gases are reacted to form water by catalytic reactor 43. Fan 41 operates continuously to circulate the nitrogen atmosphere within vessel 31.

We claim:

1. A fuel cell system for an underwater vehicle comprising, a fuel cell having an anode and cathode separated by an electrolyte, a hydrogen gas chamber adjacent said anode having input and output openings and an oxygen gas chamber adjacent said cathode having input and output openings, a first tank holding high pressure hydrogen, a second tank holding high pressure oxygen, means connecting said first and second tanks to said anode and cathode input openings, means connected to said output opening of said hydrogen gas chamber for separating water from the product water-hydrogen output, hydrogen driven pump means for pumping separated water to said first tank, and means connecting said hydrogen driven pump with said first tank whereby high pressure hydrogen from said first tank is used to drive said hydrogen driven pump, means for conducting unused high pressure hydrogen from said pump to said hydrogen gas chamber, and means for recirculating separated hydrogen to said input opening of said hydrogen gas chamber.

2. A fuel cell system for an underwater vehicle as set forth in claim 1 having means for cooling said fuel cell including a heat exchanger and an oxygen-driven pump for pumping coolant between said fuel cell and said heat exchanger and means connecting said oxygen-driven pump with said second tank and means for conducting oxygen from said oxygen driven pump to said oxygen gas chamber.

3. A fuel cell system for an underwater vehicle as set forth in claim 1 having a containment vessel enclosing said fuel cell with said first and second tanks being outside said containment vessel, and an inert gas within said containment vessel for pressurizing said containment vessel.

4. A fuel cell system for an underwater vehicle as set forth in claim 3 having a catalytic reactor within said containment vessel for forming water when hydrogen and oxygen are leaked into said containment vessel.

5. A fuel cell system for an underwater vehicle as set forth in claim 3 having a pressure transducer for detecting an increased pressure within said containment vessel due to a gas leak and providing an output signal, and having means responsive to said output signal for stopping flow of gases from said first and second tanks to said fuel cell.

References Cited
UNITED STATES PATENTS

| 3,002,039 | 9/1961 | Bacon | 136—86 B |
| 3,658,996 | 4/1972 | Frumerman | 136—86 B |
| 3,669,744 | 6/1972 | Tsenter et al. | 136—86 R |

ALLEN B. CURTIS, Primary Examiner

H. A. FEELEY, Assistant Examiner

U.S. Cl. X.R.

136—86 R